United States Patent [19]

Gerum et al.

[11] Patent Number: 5,747,683
[45] Date of Patent: May 5, 1998

[54] METHOD FOR DRIVE STABILITY ENHANCEMENT OF MULTI-UNIT VEHICLES

[75] Inventors: Eduard Gerum, Rosenheim, Germany; Palkovics Laszlo, Budapest, Hungary; Akos Semsey, Budapest, Hungary; Gabor Barta, Budapest, Hungary

[73] Assignee: Knorr-Bremse Systeme Fur Nutzfahrzeuge GmbH, Munich, Germany

[21] Appl. No.: 805,672

[22] Filed: Feb. 27, 1997

[30] Foreign Application Priority Data

Feb. 27, 1996 [DE] Germany ............... 96102864.4

[51] Int. Cl.$^6$ ............... G01M 15/00; G05B 19/00
[52] U.S. Cl. ............... 73/118.1; 364/426.016
[58] Field of Search ............... 73/116, 117.2, 73/117.3, 118.1, 862.57; 364/426.015, 426.016, 426.018, 426.019; 340/438, 439

[56] References Cited

U.S. PATENT DOCUMENTS

| | | | |
|---|---|---|---|
| Re. 33,697 | 9/1991 | McNinch, Jr. | 303/7 |
| 3,993,362 | 11/1976 | Kamins et al. | 188/112 |
| 5,001,639 | 3/1991 | Breen | 364/426.015 |
| 5,005,130 | 4/1991 | Breen et al. | 364/426.016 |
| 5,330,020 | 7/1994 | Ketcham | 180/14.2 |
| 5,403,073 | 4/1995 | Frank et al. | 303/7 |
| 5,411,322 | 5/1995 | Breen | 364/426.016 |
| 5,477,739 | 12/1995 | Holler et al. | 73/862.57 |
| 5,634,698 | 6/1997 | Cao et al. | 303/146 |

FOREIGN PATENT DOCUMENTS

| | | |
|---|---|---|
| 288 866 A2 | 11/1988 | European Pat. Off. . |
| 433 921 A2 | 12/1989 | European Pat. Off. . |
| 374 484 A1 | 6/1990 | European Pat. Off. . |
| 385 648 A3 | 9/1990 | European Pat. Off. . |
| 433 858 A2 | 6/1991 | European Pat. Off. . |
| 532 863 A1 | 3/1993 | European Pat. Off. . |
| 41 36 571 C1 | 3/1993 | Germany . |

OTHER PUBLICATIONS

"Countering An Unexpected Skid", Ken Zino, article in Road & Track, pp. 141,142 and 145, Jul. 1995.

Woodroofe, J.H., El–Gindy, M. (1992) "Application of handling and roll stability performance measures for determining a suitable tractor wheelbase", International Symposium on Heavy Vehicle Weights and Dimensions, Queens College, Cambridge, UK, Jun. 28–Jul. 2.

Tay, T.T., J.B. Moore (1991) "Adaptive LQG controller with loop transfer recovery", *Int. J. Adaptive Control and Signal Processing*, vol. 5, p. 135.

(List continued on next page.)

*Primary Examiner*—George M. Dombroske
*Attorney, Agent, or Firm*—Barnes & Thornburg

[57] ABSTRACT

A method for drive stability enhancement of multi-unit vehicle combinations which is based on an autonomous unilateral operation and pressure coordination (during braking) of the towing vehicle unit's brake system, producing a stabilizing yaw torque on the towing vehicle unit, whose calculation is based on an adaptive reference model of the vehicle combination, running in real-time on the vehicle's onboard computer and gathering information only from the towing vehicle unit, such as pneumatic pressures at the brake cylinders, pressure differences in the rear axle air bags, steering angle, yaw rate and lateral acceleration and the wheel speeds on the towing vehicle. Based on this information and the adaptive model, the hitch ange and its derivative is estimated. The unilateral barking of the rear axle of the towing vehicle generates stabilizing effect not only on the towing vehicle, but also on the towed vehicle, by influencing the motion of the hitch jackknifing, lateral swingout of the trailer or spinning out of the combination and the towed vehicle's roll-over. The system also operates when the driver applies brakes, namely, releases the brake pressure on one side, when full brake pressure is applied, and applies more brake force on the appropriate side when partial braking is conducted. The procedure can also bring the front wheels close to locking when a dangerous situation is detected from the vehicle model, such as jackknifing.

15 Claims, 4 Drawing Sheets

OTHER PUBLICATIONS

Shibahata, Y., Shimada, K., Tomari, T. (1993) "The improvement of vehicle maneuverability by direct yaw moment control", Japan, Sep.

Verma, V.S., Guntur, R.R., and Wong, J.Y. (1980) "The directional behavior during braking of a tractor/semitrailer fitted with anti-locking devices", *International Journal of Vehicle Design*, vol. 1, No. 3, pp. 195–220.

El–Gindy, M. (1992) "The use of heavy vehicle performance measures for design and regulation", *Proc. of ASME WAM*, Anaheim California, Nov. 8–13, DSC–vol. 44, pp. 367–382.

Troger, H., and Zeman, K. (1984) "A non–linear analysis of the generic types of loss of stability of the steady state motion of a tractor–semitrailer", *Vehicle System Dynamics*, vol. 13, pp. 161–172.

Abe, M., Ohkubu, N., and Kano, Y. (1994) "Comparison of 4Ws and direct yaw moment (DYC) for improvement of vehicle handling performance", *Proc. of AVEC'94*, Japan, Oct. pp. 159–164.

Kimbrough, S. (1991) "Coordinated Braking and Steering Based on Yaw–Rate, Side Slip, and Heading" ASME WAM 1991, *Proc. of Advanced Automotive Technologies*, DE–vol. 40, p. 243.

Kimbrough, S., and VanMoorhem (1992) "A Control Strategy for Stabilizing trailers via Selective Actuation of Brakes", ASME, 1992, *Transportion Systems*, DSC–VOL. 44, PP. 413–428.

Müller, A., Achenbach, W., Schindler, E., Wohland, Th., and Mohn, F.W. (1994) "Das neue Fahrsicherheitssytem Electronic Stability Program von Mercedes–Benz", ATZ, vol. 96, No. 11, pp.656–670.

van Zanten, A., Erhardt, R. And Pfaff, G. (1994) "FDR—Die Fahrdynamic Regelung von Bosch", ATZ, vol. 96 No. 11, pp. 674–689.

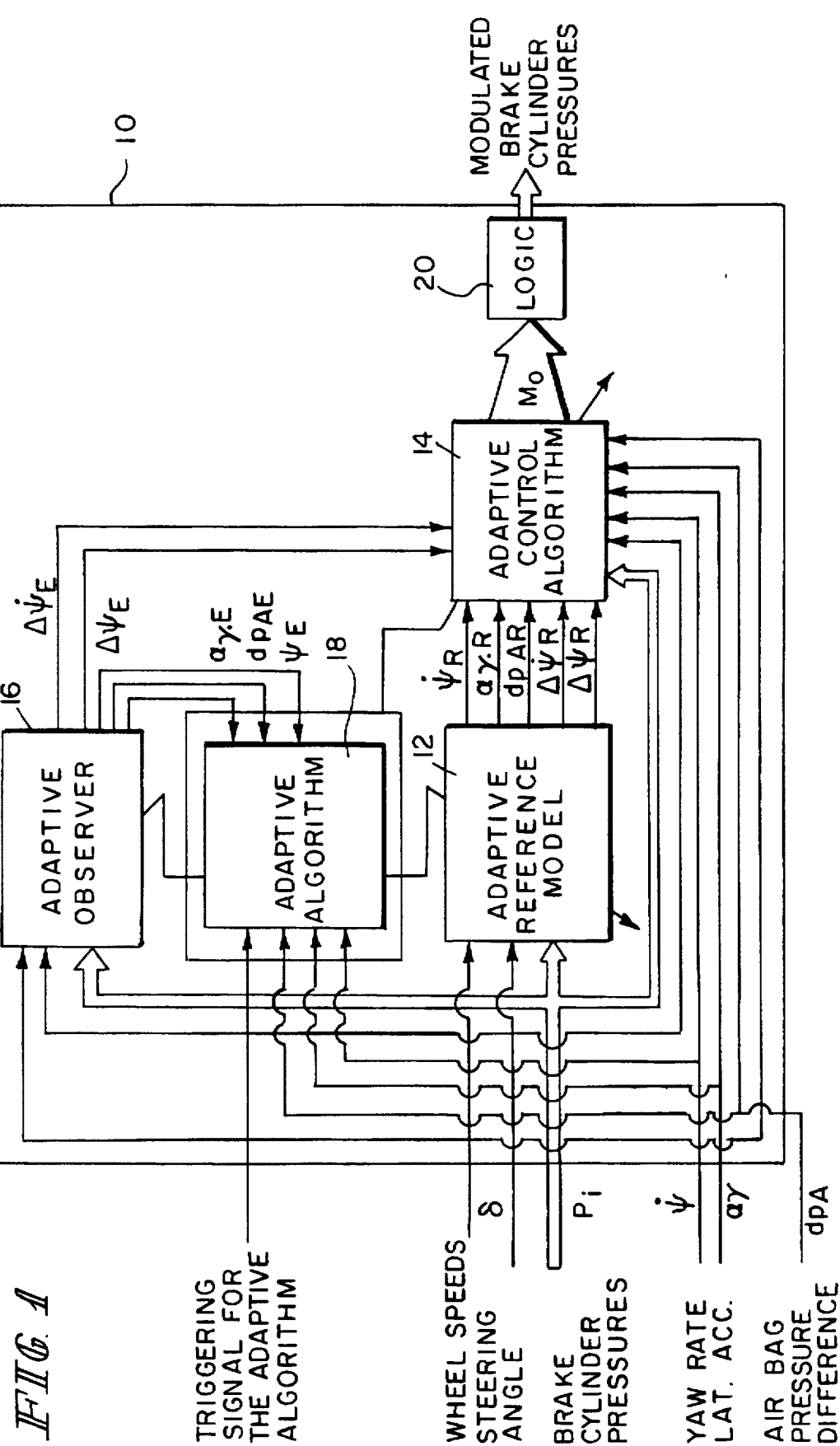

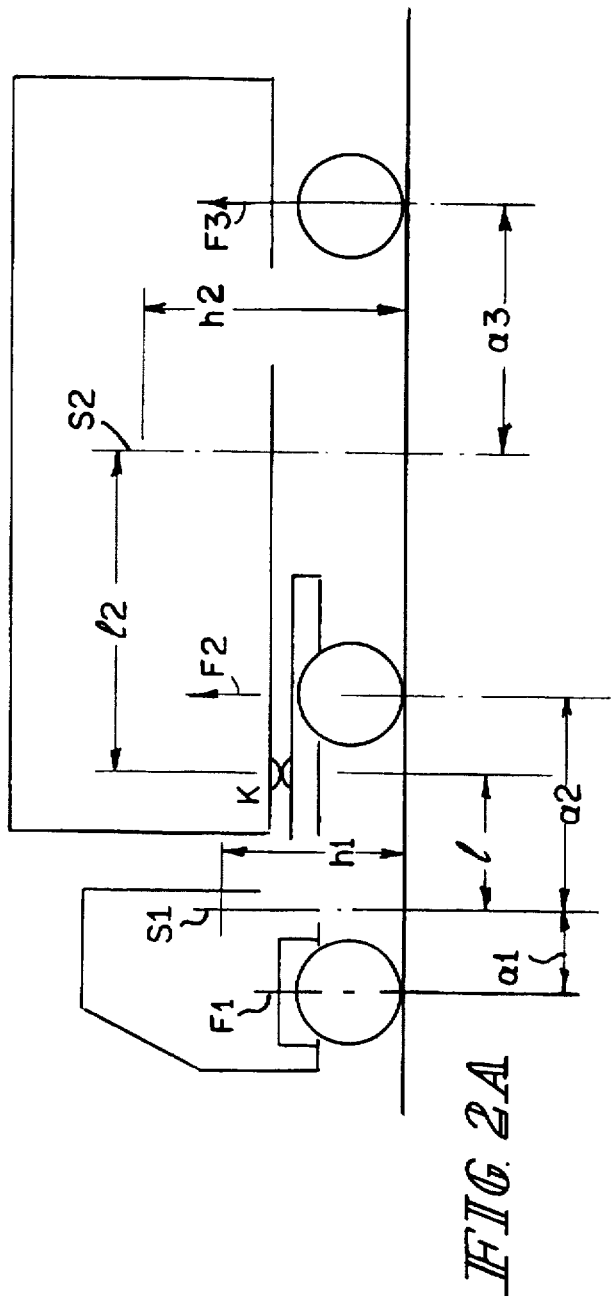
FIG. 2A
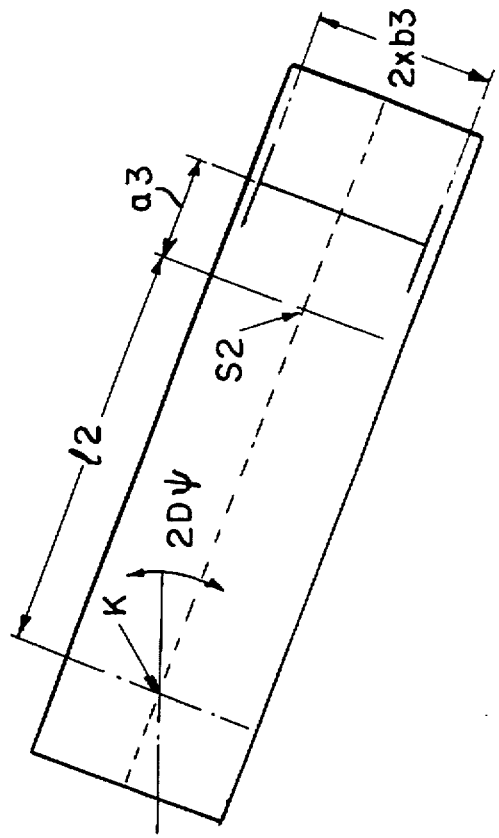
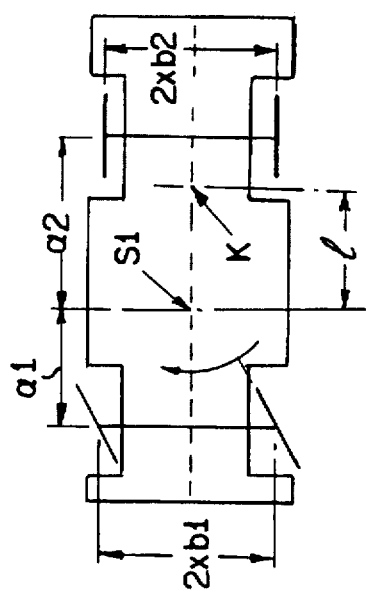
FIG. 2B

METHOD FOR DRIVE STABILITY ENHANCEMENT OF MULTI-UNIT VEHICLES

SUMMARY AND BACKGROUND OF THE INVENTION

Recent developments in the application of control systems to vehicle dynamics have begun to make it feasible, in theory at least, to achieve such varied benefits as improving the vehicle's directional behavior, preventing its loss of stability, improving its ride comfort, minimizing its likelihood of damaging its cargo, minimizing its damage to the road. Many different control systems have been devised to these ends, mainly for passenger cars, but issues of practicality remain. One of the chief questions is, does the cost of installation cover the benefits gained? Active suspension systems and active four-wheel steering appear to be beyond reach, but ABS lately has become common (after a long gestation period). The price/performance issue is sharper in the heavy-vehicle industry, which is driven by economics. Here, the purchase price of a vehicle visible and measurable, while the economic benefits of safety are difficult to see and probablistic at best. The intrinsic value of reduced risk is a worthy but difficult goal to justify striving for.

Nevertheless, from a multiple redundancy standpoint, such a systems appear to have a place. By this, design engineers aim (or ought to aim) at preventing the vehicles' handling from ever reaching the point where only the luck or the driver's skill remains to prevent an accident. This can be a thin margin of safety. During a sever lane-change maneuver, for example, the driver may be unable to control the entire vehicle adequately, since he or she does not have enough information about the state of the system and, in any event, can intervene throughly the steering wheel and the brake pedal. In some cases, the wrong steering and braking may even cause more unstable directional behavior and eventually, the roll-over or jackknifing of the entire vehicle.

The most dangerous motions of tractor-semi-trailer vehicle combination can be classified after Verma et al. (1980) into three groups. The first type is called jackknifing, which is mainly caused by the uncontrolled large relative angular motion of the tractor and the trailer, which results in the lateral slip of the rear axles of the tractor. The jackknifing phenomenon is one of the most common causes of serious traffic accidents in which tractor-semitrailers are involved. The main problem with this type of stability loss is that if the articulation angle exceeds a certain critical limit, the driver becomes unable to control the motion of the vehicle by steering the tractor. Even before reaching this critical angle, the problem may become worse if the driver steers the tractor in an inappropriate direction. The aim of a control design is to prevent this critical situation from developing. By using a suitable control strategy, the probability of jackknifing can be decreased and the possibility of inappropriate driver reaction exacerbating the situation can be avoided.

The second typically dangerous class of articulated vehicles motions is the lateral oscillation of the trailer, which may be caused by some disturbances (e.g., side wind gust, abrupt steering effort by the driver) acting on the vehicle. When the design and/or operating parameters of the system are close to the critical values, the vehicle becomes self-excited. This means that after some disturbance, the vehicle loses its stability and the system's trajectory will tend to some other limit set. In studies conducted by Troger and Zeman (1984) and Kacani et al. (1987) the nonlinear stability problems of tractor-semitrailer combinations are discussed in detail and the vehicle systems were investigated after their loss of stability. Recently, El-Gindy (1992) and Woodrooffe et al. (1992) have proposed a set of safety-related performance measures which can be used for selecting a suitable control strategy for a heavy vehicle. The last typical reason for heavy commercial vehicle accidents is the roll-over. An interesting statistics was found by Sparks and Berthelot (1989), as an example. Based on the mentioned investigation, the jackknifing and roll-over accidents were categorized as follows:

preventable, which means that the driver would have been able to avoid the accident if a warning device had been installed on the vehicle. Only 3.3% of a total accidents were judged to be preventable;

potentially preventable, which means the accident might have been prevent depending on the skill of the driver and performance of the warning device (38.4%);

non-preventable, into which class the 49.7% of the total accidents were categorized; and preventable unknown, which involves only 8.6% of the total number of accidents.

These statistics prove two facts:

38% of the accidents might have been avoided if the vehicle had been installed with a warning system that would signal the driver to correct the vehicle's motion in some appropriate way before the accident occurs; and the majority (almost 50%) of the accidents would not have been avoided with just a warning system as even as skilled driver would not have been able to control the vehicle motion behind a certain point.

The second statement explains clearly the role of and the need for an actively controlled stability enhancement system, which will be discussed below.

The vehicle outputs can be categorized as either those sensible directly by the driver or those not sensible by the driver. The signals belonging to the first class are primarily lateral acceleration, acceleration/deceleration, roll angle (all of the tractor). The following signals cannot be sensed by a driver: the articulation rate, roll dynamics of the trailer (especially if it is a full trailer), tire forces and several others. The goal of the controller application is to measure or estimate these signals and react according to both sensible and non-sensible signals to improve the performance of the vehicle.

By analyzing the behavior of articulated vehicles, one can observe that the driver's steering input is governed mainly by his/her reaction to the behavior of the lead vehicle unit (tractor or truck). Therefore, the behavior of the towed unit(s) (semitrailer or full trailer) in a real closed-loop driver-vehicle systems is not controlled directly by the driver. The aim of a controller design is to influence the motion of the trailer(s) according to the measured or estimated states of the articulated vehicle units, and taking corrective action before the driver's reaction, which might be delayed, incorrect due to human factors, especially on the vehicle's stability limits.

REFERENCES

[Elg. 92] El-Gindy, M. (1992) "The use of heavy vehicle performance measures for design and regulation", *Proc. of ASME WAM*, Anaheim Calif., November 8–13, DSC-Vol. 44, pp. 367–382.

[Kac. 87] Kacani, V., Stribersky, A., and Troger, H. (1987) "Maneuverability of a truck-trailer combination after loss of lateral stability", *Proceedings of 10th IAVSD Symposium*, Prague, 24–28 August.

[Spa, 89] Sparks, G. A., and Berthelot, C. (1989) "The Cost/Benefit Analysis of a Rollover Warning Device for Large Trucks", Sparks and Associates Ltd., Saskatoon, Saskatchewan, June.

[Tro, 84] Troger, H., and Zeman, K. (1984) "A non-linear analysis of the generic types of loss of stability of the steady state motion of a tractor-semitrailer", *Vehicle System Dynamics*, Vol. 13, pp. 161–172.

[Ver, 80] Verma, V. S., Guntur, R. R., and Wong, J. Y. (1980) "The directional behavior during braking of a tractor/semitrailer fitted with anti-locking devices", *International Journal of Vehicle Design*, Vol. 1, No. 3, pp. 195–220.

[Woo, 92a] Woodrooffe, J. H., and El-Gindy, M. (1992a) "Application of handling and roll stability performance measures for determining a suitable tractor wheelbase", *International Symposium on Heavy Vehicle Weights and Dimensions*, Queens College, Cambridge, June 28–July 2.

[Woo, 92b] Woodroofe, J. H., El-Gindy, M. (1992b) "Application of handling and roll stability performance measures for determining a suitable tractor wheelbase", *International Symposium on Heavy Vehicle Weights and Dimensions*, Queens College, Cambridge, UK, June 28–July 2.

State-of-the-Art

One of the known investigations in the field of coordinated braking has been conducted by Kimbrough (1991). In this paper, the performance of a coordinated braking and steering system was analyzed. During this work the author reached a very important finding, namely generating brake force on one side of a coupled vehicle's trailer can stabilize the trailer's behavior very well. The result of this work were published in Kimbrough et al. (1992) carried out for passenger car/trailer combination.

The controller was designed by using reference model following control principle with a Lyapunov controller. With this controller, the internal damping of the coupled vehicle configuration became higher, thus the articulation angle during a certain maneuver was decreased. However, the application of the trailer's brakes did not improve the towing unit's behavior, even more, the towing vehicle's yaw rate became higher. The other general problem with braking the trailer's wheels is that one will need to have an instrumentation on the trailer, which is not feasible especially for heavy commercial vehicles.

One of the solutions from Japan was invented by Shibahata et al. (1992). This system is based on the calculation of the optimal yaw torque of the vehicle ensuring stable behavior even at the non-linear regions close to the critical limits. The brake and traction force coordination is the tool they use for the generation of the required torque while accelerating or decelerating. The system was implemented on a four-wheel-drive vehicle with an equal traction/brake force distribution between the front and rear axles. This system was modified only for the two rear wheels, which were controllable individually. The measurements on the prototype vehicle have shown that this control improves the vehicle stability in a whole region of the tire forces, although it does not brake the wheels autonomously.

An interesting comparison of the direct yaw moment control (DYC) and four wheel steering system (4WS) was conducted by Abe et al. (1994). One of the most important finding of this research is that the 4WS system relies on the lateral forces generated by the rear steered wheels, which has some limitation due to the saturation property of the tire lateral force characteristics. Beyond the limits of 4WS, the DYC seems to be an appropriate tool for producing stabilizing torque since some longitudinal force is still available even in the saturation range of the lateral force. This study was carried out for a single vehicle, and the yaw torque is generated by either selective braking or by a transversal torque split control system. The combined system gives very good results, but the application of a torque split control system makes this solution very expensive even on a passenger car. It does not seem to be feasible on heavy commercial vehicles.

The most developed system on the market is the system from Bosch and was implemented first by Mercedes Benz on passenger cars. This system is named as FDR (Fahrdynamikregelung) in the Bosch terminology and ESP (Electronic Stability Program) in the Mercedes usage. This system's operation is based on advanced sensoring and using the existing actuators in the vehicle (see in Muller et al. (1004) and van Zanten et al. (1994)), however, this system is only effective on single vehicles.

REFERENCES

[Abe, 94] Abe, M., Ohkubu, N., and Kano, Y. (1994) "Comparison of 4WS and direct yaw moment (DYC) for improvement of vehicle handling performance", *Proc. of AVEC'94*, Japan, October, pp. 159–164.

[Kim, 91] Kimbrough, S. (1991) "Coordinated braking and steering control for emergency stops and acceleration", ASME WAM 1991, *Proc. of Advanced Automotive Technologies*, DE-Vol. 40, pp. 243.

[Kim, 92] Kimbrough, S., and VanMoorhem (1992) "A Control Strategy for Stabilizing trailers via Selective Actuation of Brakes", *ASME 1992, Transportation Systems*, DSC.-Vol. 44, pp. 413–428.

[Mul, 94] Müller, A., Achenbach, W., Schindler, E., Wohland, Th., and Mohn, F. W. (1994) "Das neue Fahrsicherheitssytem Electronic Stability Program von Mercedes-Benz", *ATZ*, Vol. 96, No. 11, pp. 656–670.

[Shi, 992] Shibahata, Y., Shimada, K., Tomari, T. (1992) "The improvement of vehicle maneuverability by direct yaw moment control", *Proc. of AVEC'92*, Japan, September, pp. 452–457.

[Zan, 94] van Zanten, A., Erhardt, R. and Pfaff, G. (1994) "FDR—Die Fahrdynamik Regelung von Bosch", *ATZ*, Vol. 96, No. 11, pp. 674–689.

SUMMARY OF THE INVENTION

The method described in this patent is based on the finding that the overall handling characteristics of multi-unit vehicles can be influenced mostly by producing stabilizing torque on the rear axle of the towing vehicle by using the most powerful actuator available on the vehicle, namely the brake system, by a modified control algorithm. Since the highest axle load is available on the rear axle of the towing vehicle, the largest possible brake force is available here, and the hitch point is close to this axle, so the motion of the hitch point, where the forces and torques are transmitted to the towed vehicles, can be influenced in a large extent. It was also found that for controlling the dynamic behavior of the combination, it is not enough to feed back information only about the towing vehicle, the relative angle and its derivative between the towing and towed vehicles also have to be estimated for proper control. For this reason, a more advanced vehicle model for state estimation has to be used, utilizing the measured air bag pressure difference, brake chamber pressures, yaw rate, lateral acceleration and steering wheel angle and the wheel speeds on the towing vehicle unit. It was found that (unlike in passenger cars) a fixed controller cannot be used, since the heavy commercial vehicles parameters (especially the trailer's weight, weight distribution) are varying large range, which has strong influence on the controller. Due to this fact, an adaptive control algorithm has to be used. It was also found, that the vehicle combination cannot be controlled only by feeding back the directly measurable information, but some of the towed vehicle related variables (hitch angle, hitch angle rate) have to be estimated and used for control. The control algorithm described here is based on the finding that the control input should be the optimal yaw torque, as a measurement signal for the vehicle combination, produced only on the towing unit and calculated by means of the vehicle model and the mentioned measured and estimated signals. Furthermore, it was found that the side-slip angle of the towing vehicle, and also the hitch angle can also be influenced by the brake control of the front axle wheels, letting the wheels decelerating in greater extent than the ABS permits when the driver applies brake.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram of the control logic according to the principles of the present invention.

FIGS. 2A and 2B are diagrams showing the geometric parameters of a multi-unit vehicle.

DETAILED DESCRIPTION OF THE PREFERRED EMBODIMENTS

Figure 3:
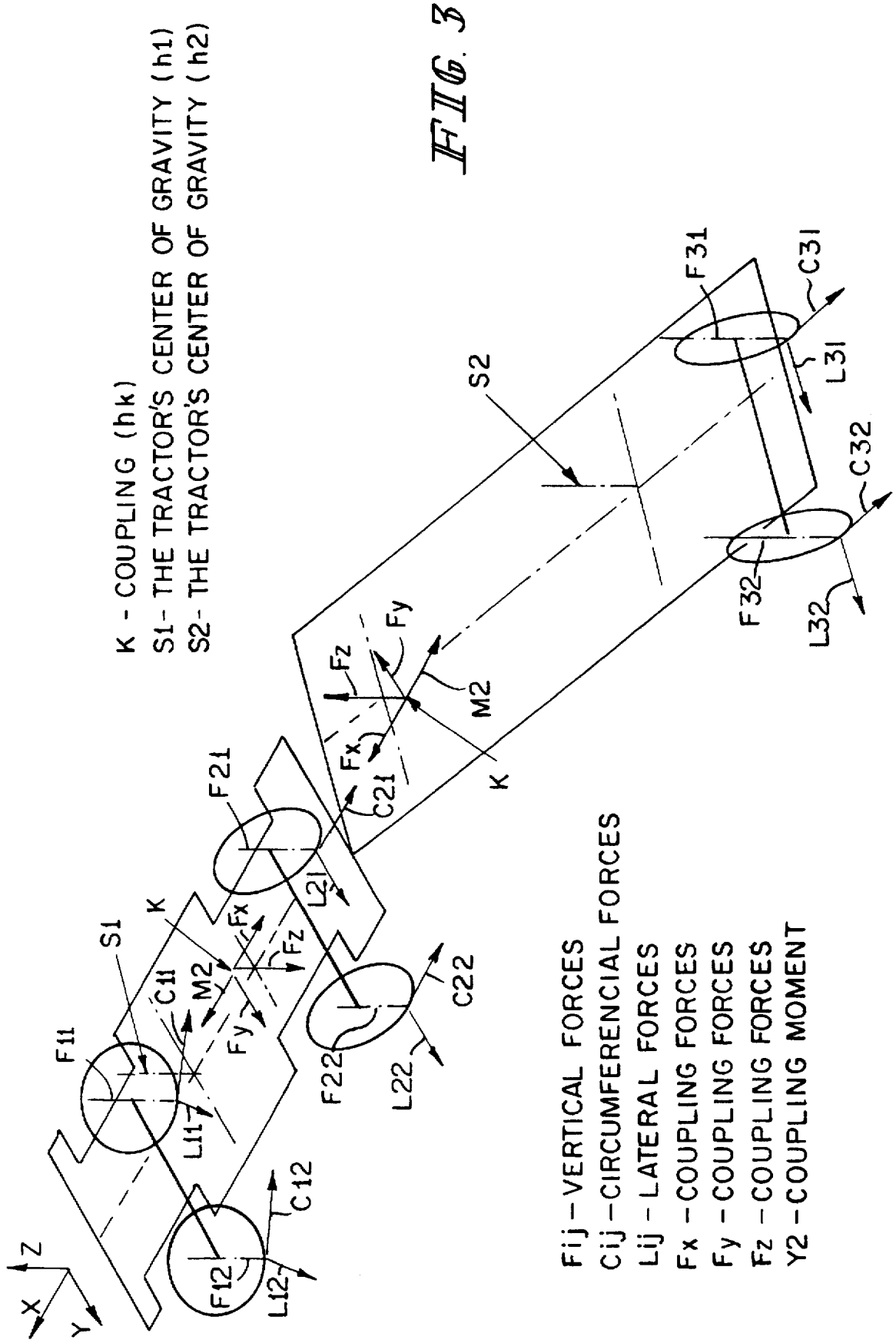
FIG. 3 is a diagram showing the force and torques in a multi-unit vehicle.

A block diagram of the control logic of the present invention is shown in FIG. 1. A set of the measured data, including the following signals, are the inputs to the control scheme: steering angle $\delta$, brake cylinder pressures at each wheel of the towing vehicle $P_i$, yaw rate $\dot\psi$, lateral acceleration $a_y$ and the difference between the right and left air bags of the tractor's or towing vehicle's rear axle $dp_A$ and the wheel speeds on the tractor. The brake cylinder pressures are already measured as a part of Knorr EBS concept, as well as the pressures in the rear axle airbags on the tractor. An additional triggering signal is fed into the module, which activates the model adaptation and the controller design, based on the quasi-static vehicle model will be described below.

The wheel speeds, steering angle $\delta$ and the brake pipe pressure $p_i$ are provided directly to an adaptive reference model 12 of the module 10. The outputs of the adaptive reference model 12 provided to the adaptive control algorithm 14 as reference signals are yaw rate $\dot\psi_R$, lateral acceleration $a_{y,R}$, airbag pressure difference $dp_{AR}$, rate of change of the hitch angle $\Delta\dot\psi_R$ and the hitch angle $\Delta\psi_R$. An adaptive observer 16 also provides to the adaptive control algorithm 14 estimated values of the rate of change of hitch angle $\Delta\dot\psi_E$ and hitch angle $\Delta\psi_E$ and receives as its input the brake cylinder pressure. The adaptive observer 16 also provides to the adaptive algorithm 18, estimates of lateral acceleration $A_{y,E}$, the airbag pressure difference $dp_{A,E}$ and yaw rate $\dot\psi_E$. The actual yaw rate $\dot\psi$, lateral acceleration $a_y$ and the Airbag pressure difference, $dp_A$, are provided to the adaptive algorithm 18 and the adaptive control algorithm 14. The adaptive algorithm 18 controls the adaptive reference model 12, the adaptive control algorithm 14 and the adaptive observer 16. The output of the adaptive control algorithm 14 is a matrix $M_o$ of the yaw vector parallel to the Z axis provided to logic 20 which modulates the brake cylinder pressure to produce the desired yaw torque about the Z axis.

Description of the Model Used for the State Estimator and Reference Model

The mechanical model consists of two coupled rigid bodies. The first one represents the towing vehicle or tractor (indexed with 1) and the second one is the towed vehicle or semi-trailer (indexed with 2). The model parameters are shown in FIGS. 2A and 2B, the acting forces and torques or moments are depicted in FIG. 3. The model is non-linear, describes the in-plane dynamics of the vehicle, and also takes the load transfer between the left and right sides, and the front and rear axles into consideration by describing it by quasi-static manner, using the suspension and coupler roll stiffnesses. It results in algebraic equations added to the dynamic equations of motions derived below.

The equations of motion for the tractor:

$$m_1 a_{1x} = -(C_{21}+C_{22}+F_x)-(C_{11}+C_{12})\cos\delta-(L_{11}+L_{12})\sin\delta \quad (1)$$

$$m_1 a_{1y} = L_{21}+L_{22}+F_y+(L_{11}+L_{12})\cos\delta-(C_{11}+C_{12})\sin\delta \quad (2)$$

$$J_1\dot\psi_1 = (C_{22}-C_{21})b_2-(L_{21}+L_{22})a_2-F_y l + ((L_{11}+L_{12})\cos\delta-(C_{12}+C_{11})\sin\delta)\cdot a_1-((C_{11}-C_{12})\cos\delta+(L_{11}-L_{12})\sin\delta)\cdot b_1 \quad (3)$$

and for the trailer:

$$m_2 a_{2x} = -(C_{31}+C_{32})+F_x\cos\Delta\psi+F_y\sin\Delta\psi \quad (4)$$

$$m_2 a_{2y} = L_{31}+L_{32}-F_y\cos\Delta\psi+F_x\sin\Delta\psi \quad (5)$$

$$J_2\dot\psi_2 = (C_{32}-C_{31})\cdot b_3-(L_{31}+L_{32})\cdot a_3+F_x l_2\sin\Delta\psi-F_y l_2\cos\Delta\psi \quad (6)$$

where $C_{ij}$ is the tires circumferential force between the tire and the ground, the indexes $._{ij}$ identify the wheel which has the mentioned tire. The first index i means the axle where 1: the tractors front axle, it is steered; 2: the tractors second axle/axles its/they/one from it is/are/is driven; 3: the trailers axle/axles; it/they is/are neither drive or steered. The second index (j) means the wheel on the axle where: 1: tire on the right handside; 2: tire on the left handside. $L_{ij}$ is the tire's lateral force; $F_{ij}$ is the tire's vertical force and; $F_x$, $F_y$ and $F_z$ are the hitch force components. $M_2$ is the moment about the X axis and whose vector is parallel with the x-axis of the tractor. $m_1/m_2$ and $J_1/J_2$ are the masses and the moments of inertia of the tractor/of the semitrailer. $a_1/a_2$ is the distance between the tractors front/rear axle and center of gravity. $b_1/b_2$ is the half-trackwidth of the tractors front/rear axle. 1 is the distance between the tractors center of gravity and the king pin. $a_3$ is the distance between the trailers center of gravity and the trailers axle; $b_3$ is the half-trackwidth of the trailer's axle, and $l_2$ is the distance between the trailer's center of gravity and the king pin. $a_{1x}/a_{2x}$ and $a_{1y}/a_{2y}$ are the longitudinal and the lateral accelerations of the tractor/semi-trailer. $\dot\psi_1/\dot\psi_2$ is the yaw acceleration of the tractor/semi-trailer. $\delta$ is the steering angle and $\Delta\psi$ is the hitch angle.

The constrain equations at the coupler can be considered:

$$a_{1x} + \dot{\psi}_1^2 l = (a_{2x} - \dot{\psi}_2^2 l_2)\cos\Delta\psi + (a_{2y} + \ddot{\psi}_2 l_2)\sin\Delta\psi \quad (7)$$

$$a_{1y} - \ddot{\psi}_1 l = (a_{2y} + \ddot{\psi}_2 l_2)\cos\Delta\psi - (a_{2x} - \dot{\psi}_2^2 l_2)\sin\Delta\psi \quad (8)$$

$$\frac{d}{dt} v_i = a_{yi} - \dot{\psi}_i u_i \quad i = 1,2 \quad (9)$$

$$\frac{d}{dt} u_i = a_{xi} + \dot{\psi}_i v_i \quad i = 1,2 \quad (10)$$

where $\dot{\psi}_1/\dot{\psi}_2$ is the yaw rate, $u_1/u_2$ is the longitudinal speed and $v_1/v_2$ is the lateral speed of the tractor/semi-trailer. The accelerations $a_{xi}$ and $a_{yi}$ are given in the moving coordinate-systems of the bodies. If it is assumed that the tractor and the semi-trailer neither pitch or roll, the following equilibrium equations can be composed:

$$F_{11} + F_{12} + F_{21} + F_{22} = m_1 g + F_z \quad (11)$$

$$(F_{21} + F_{22}) \cdot a_2 - (F_{11} + F_{12}) \cdot a_1 = F_z l + F_x h_k + m_1 a_{1x} h_1 \quad (12)$$

$$(F_{11} - F_{12}) \cdot b_1 = \frac{K_f}{K_f + K_r} (m_1 a_{1y} h l + M_2 - F_y h_k) \quad (13)$$

$$(F_{21} - F_{22}) \cdot b_2 = \frac{K_r}{K_f + K_r} (m_1 a_{1y} h_1 + M_2 - F_y h_k) \quad (14)$$

where $K_f$ and $K_r$ are the front and rear roll stiffnesses of the tractor, and for the semi-trailer:

$$F_{31} + F_{32} = m_2 g - F_z \quad (15)$$

$$(F_{32} + F_{31}) \cdot a_3 = F_z l_2 - F_x \cos\Delta\psi h_k - F_y - F_y \sin\Delta\psi h_k + a_{2x} m_2 h_2 + M_2 \sin\Delta\psi \quad (16)$$

$$(F_{31} - F_{32}) \cdot b_3 = a_{2y} m_2 h_2 + F_y \cos\Delta\psi h_k - F_x \sin\Delta\psi h_k - M_2 \cos\Delta\psi \quad (17)$$

The above equations can be transferred into the state equation form as follows:

$$\dot{x} = f(x, u_1, u_2, p, t) \quad (18)$$

$$g = g(x, \dot{x}, u_1, u_2, p, t) \quad (19)$$

$$x^T = (u_1 \; v_1 \; \dot{\psi}_1 \; \Delta\psi \dot{\Delta\psi}) \quad (20)$$

where the x is the state vector of the model described above, the $u_1$ is the external input vector, $u_2$ is the control input vector, p consists of the parameters and t is time. The Equation 19 describes the equilibrium equations derived in Equations 11-17. Simplified tire formulae is used to describe the circumferential and lateral forces acting on the tires, as a function of vertical force, side-slip and longitudinal slip.

The above described dynamical model is used for estimating first some unknown trailer parameters (cg height of the semi-trailer, $h_2$; the inertia of the semi-trailer, $J_2$). Other parameters, which are functions of operating conditions (trailer mass and the longitudinal location of the cg), are known from the EBS, where they are already estimated. The simplified tire model parameters are also estimated based on the above described model. The adaptive parameter identification of the model is activated each time the vehicle engine is turned on. The longitudinal tire parameters and the cg height of the trailer are estimated during the first couple of braking, when the steering wheel angle is relatively small (the vehicle does not turn). The lateral tire parameters and the trailer's inertia is estimated when the vehicle is negotiating a turn at no braking. There is a default controller valid for a typical configuration, which is acting during the learning period. This default controller is designed only for the towing vehicle, and effective when the adaptive learning algorithm is not convergent (such as no trailer's presence was detected). The controller calculates side slip angle based on the model parameters and the measured tractor variables, and uses that in the controller design.

Description of the Adaptive Torque Controller

The adaptive torque controller is designed by means of a black-box identified model and after the recursive design, it is used with the non-linear state estimator. The adaptive linear quadratic (LQ) type controller is designed in the following two steps:

In the first stage, a scalar autoregressive with external input (ARX) type model is identified from the measured and the adaptive observer provided signals in the following recursive way (in discrete time domain): identify the transfer function of the plant S(k) between $y_2$ and $u_2$ in the presence of additive noise $w(k)$:

$$y_2(k) S(k) u_2(k) + w(k) \quad (21)$$

Let the structure of S(k) be autoregressive with exogenous variables (ARX) as follows:

$$\hat{A}(k) y_2(k) = \hat{B}(k) u_2(k) + w(k), \quad (22)$$

$$\hat{\Theta}(k) = \hat{\Theta}(k-1) + \frac{P(k-1)}{1 + \chi(k)^T P(k-1) \chi(k)} \chi(k) [y_2(k) - \chi(k)^T \hat{\Theta}(k-1)] \quad (23)$$

where $$\hat{A}(k) = 1 + \hat{a}_1(k) z^{-1} + \ldots + \hat{a}_n(k) z^{-n}$$

$$\hat{B}(k) = \hat{b}_1(k) z^{-1} + \ldots + \hat{b}_n(k) z^{-n}$$

$$P(k) = P(k-1) - \frac{P(k-1) \chi(k) \chi(k)^T P(K-1)}{1 + \chi(k)^T P(k-1) \chi(k)} + R_1$$

$$\chi(k)^T = (-y_2(k-1) - y_2(k-2) \ldots -y_2(k-n) u_2(k-1) u_2(k-2) \ldots u_2(k-n))$$

$$\hat{\Theta}(k) = (\hat{a}_1(k) \hat{a}_2(k) \ldots \hat{a}_n(k) \hat{b}_1(k) \hat{b}_2(k) \ldots \hat{b}_n(k))$$

$$P(0) = P_0,$$

$$R_1 = E[w(k) w(k)^T].$$

The estimation of the state-space representation of the identified model can be written in the following companion matrix form:

$$x(k+1) = F(k) x(k) + G(k) u_2(k) \quad (24)$$

$$y_2(k) = H(k) x(k), \quad (25)$$

where the matrices F, G, H can be written calculated in a standard way.

$$F(k) = \begin{bmatrix} -\hat{a}_1(k) & 1 & 0 \ldots 0 \\ -\hat{a}_2(k) & 0 & 1 \ldots 0 \\ \ldots & & \\ -\hat{a}_n(k) & 0 & 0 \ldots 1 \end{bmatrix}, G(k) = \begin{bmatrix} -\hat{b}_1(k) \\ -\hat{b}_2(k) \\ \ldots \\ -\hat{b}_n(k) \end{bmatrix}$$

-continued $$H(k) = (1\ 0\ 0\ \ldots\ 0)$$

In the second stage the adaptive linear quadratic gaussin (LQG) controller is designed by the following control law (see in Tay et al. (1991)):

$$u_2(k)=K_c(k)^T \hat{x}(k), \quad (27)$$

where the x is the observer estimated signal, and the control gain is $$K_c(k)=-(G(k)^T P(k) G(k)+R_c)^{-1} G(k)^T P(k) F(k), \quad (28)$$

and $$P(k+1)=F(k)^T[P(k)-P(k)G(k)(G(k)^T P(k)G(k)+R_c)^{-1}G(k)P(k)]F(k)+Q_c.$$

$$Q_c(k)=H(k)^T H(k), R_c=I, P(0)=0 \quad (29)$$

Figure 4:
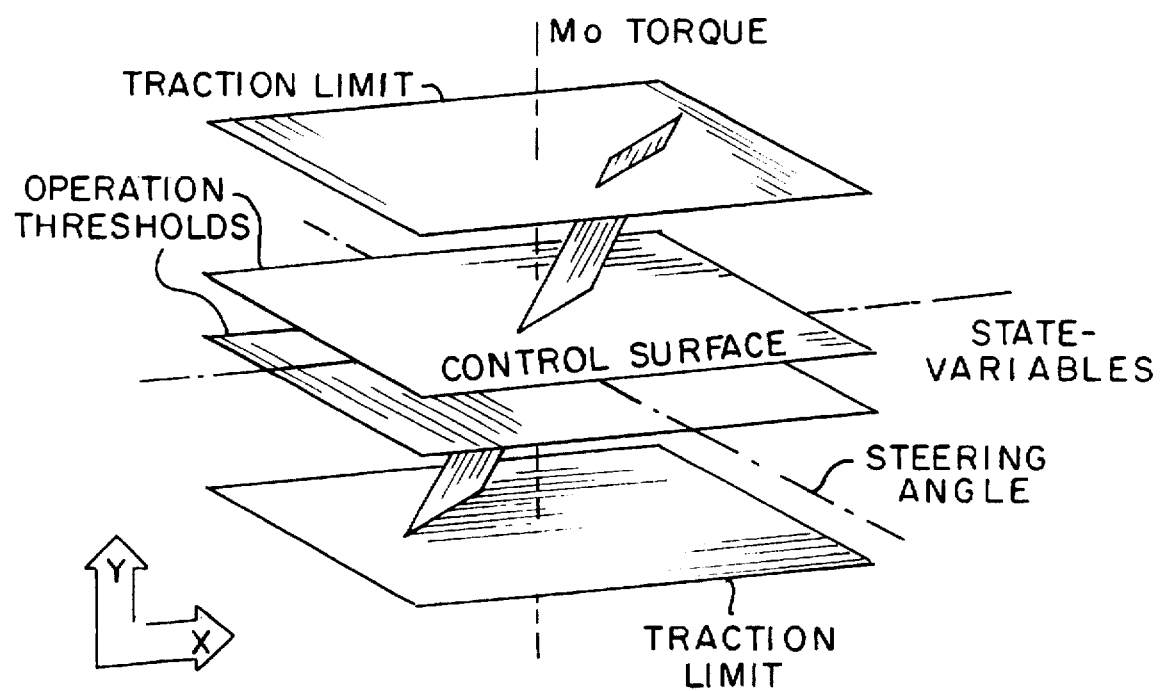
FIG. 4 is a schematic of a model of a nonlinear torque controller according to the principles of the present invention.

After the adaptive design is finished, the above described controller is implemented in a virtual model following control scheme based on the estimated signals and the previously mentioned adaptive virtual model. However, there are two limiting values on the available yaw torque $M_o$, generated by the unilateral brake control on the tractor:

avoiding the continuous operation of the brake system, a minimum yaw torque level should be defined, under which the brake system is ineffective. By varying this limit, the torque controller's sensitivity can be tuned, the severity of the maneuver can be adjusted.

there is a physical (upper limit) on the torque controller's operation, since the maximum stabilizing yaw torque is determined by the actual friction on the road, as seen in FIG. 4.

Reference

[Tay, 1992] Tay, T. T., J. B. Moore (1991) "Adaptive LQG controller with loop transfer recovery", *Int. J. Adaptive Control and Signal Processing*, Vol. 5, pp. 135.

What is claimed:

1. A method of obtaining, in a combined vehicle control system, state variables of a towed vehicle of said vehicle combination which includes said towed and a towing vehicle coupled at a hitch and having sensors on said towing vehicle, the method comprising:

adaptively estimating combined vehicle parameters, including hitch angle and hitch angle rate, using measured signals from said sensors on said towing vehicle;

adaptively modeling combined vehicle parameters, including hitch angle and hitch angle rate, using measured signals from said sensors on said towing vehicle; and adaptively calculating state variables of said towed vehicle using said estimated combined vehicle parameters, said modeled combined vehicle parameters and said measured signals from said sensors.

2. The method according to claim 1, wherein said measured signals include at least two of the following towing vehicle parameters: pressure difference between left and right air bags on the rear axle, brake cylinder pressures, steering angle, yaw rate, lateral acceleration of the towing vehicle speed of each wheel.

3. The method according to claim 2, wherein said adaptive estimating and modeling provide estimate and model parameters corresponding to said measured towing vehicles.

4. The method according to claim 1, wherein said adaptive estimating and modeling provide estimate and model parameters corresponding to said measured towing vehicle.

5. The method according to claim 1, including detecting possible jackknifing of the combined vehicle; and if jackknifing is detected braking the wheels of the front axle to be close to locking.

6. The method according to claim 1, wherein estimating said state variables includes estimating longitudinal tire parameters of the towed vehicle during braking and when the steering angle is relatively small.

7. The method according to claim 1, wherein estimating said state variables includes estimating lateral tire parameters of the towed vehicle during a turn with no braking.

8. The method according to claim 1, including setting said state variable to a default set of state variables during calculating.

9. The method according to claim 8, wherein said differential of braking is created by applying one of said side brakes if neither are applied, increasing braking on one of said side brakes when the brakes are partially applied and partially releasing one of said side brakes when the brakes are fully applied.

10. A method of enhancing stability of a vehicle combination including a towed and a towing vehicle using the brakes on said towing vehicle, comprising:

calculating the yaw torque required to be produced on the towing vehicle to maintain the combined vehicles' state variables as close as possible to a reference model's state variables; and creating a differential in braking between the two sides of the rear axle of the towing vehicle to produce said required yaw torque.

11. The method according to claim 10, wherein said brakes are pneumatic brakes and a differential in brake pressure is created.

12. The method according to claim 10, wherein said calculating yaw torque includes:

adaptively estimating combined vehicle parameters, including hitch angle and hitch angle rate of a hitch coupling said vehicles, using measured signals from sensors on said towing vehicle;

adaptively modeling combined vehicle parameters, including hitch angle and hitch angle rate, using measured signals from said sensors on said towing vehicle; and adaptively calculating state variables of said towed vehicle using said estimated combined vehicle parameters, said modeled combined vehicle parameters and said measured signals from said sensors.

13. The method according to claim 12, wherein said measured signals include at least two of the following towing vehicle parameters: pressure difference between left and right air bags on the rear axle, brake cylinder pressures, steering angle, yaw rate, lateral acceleration of the towing vehicle and speed of each wheel.

14. The method according to claim 13 wherein said adaptive estimating and modeling provide estimate and model parameters corresponding to said measured towing vehicle.

15. The method according to claim 10, including detecting possible jackknifing of the combined vehicle; and if jackknifing is detected braking the wheels of the front axle to be close to locking.

* * * * *